United States Patent [19]
Meadows

[11] Patent Number: 5,181,936
[45] Date of Patent: Jan. 26, 1993

[54] PROCESS FOR HEAT SEALING A COVER TO A CONTAINER

[75] Inventor: Clarence A. Meadows, Muncie, Ind.

[73] Assignee: General Motors Corporation, Detroit, Mich.

[21] Appl. No.: 753,546

[22] Filed: Sep. 3, 1991

[51] Int. Cl.$^5$ .................. H01M 2/00; B32B 31/20
[52] U.S. Cl. .................. 29/623.2; 156/309.9
[58] Field of Search .................. 29/623.2, 623.4; 156/60, 308.4, 309.9; 429/175, 176

[56] References Cited

U.S. PATENT DOCUMENTS 3,441,448  4/1969  Hayward et al. .................. 136/176
3,778,314  12/1973  Kano et al. .................. 136/176
4,460,663  7/1984  Stutzbach et al. .................. 429/151

Primary Examiner—Anthony Skapars
Attorney, Agent, or Firm—Lawrence B. Plant

[57] ABSTRACT

Process for heat sealing a thermoplastic cover to a thermoplastic container wherein the cover has a channel formed thereon for receiving a sealing lip on the container walls. The lip and floor of the channel are melted and then cooled to form a solidified skin of thermoplastic over a molten core, the lip is mated with the channel and the melted portions thereof coalesced with the melt from the floor. Some of the coalesced melt exudes between the lip and the sides of the channel and solidifies to provide additional bonding. The produce produced by the process is also claimed.

5 Claims, 1 Drawing Sheet

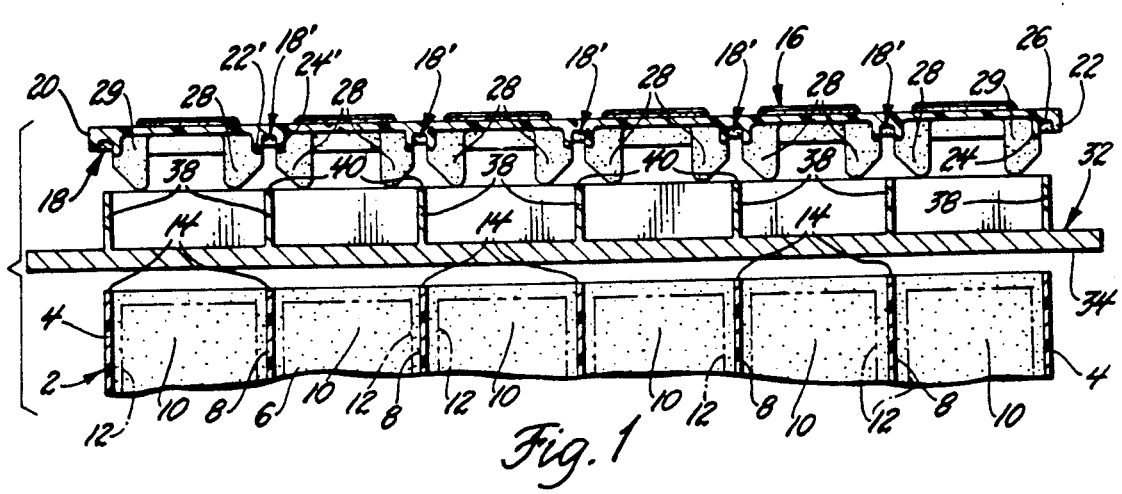
Fig. 1
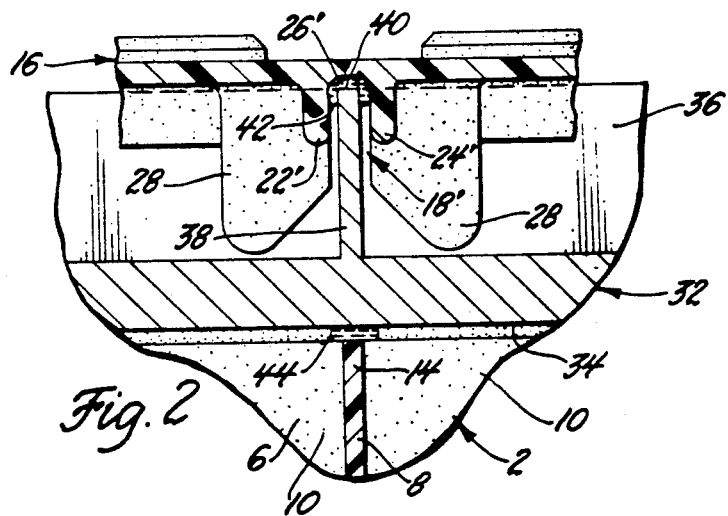
Fig. 2
Fig. 3
Fig. 4

PROCESS FOR HEAT SEALING A COVER TO A CONTAINER

This invention relates to thermoplastic containers and covers and more particularly to hermetic heat seals therebetween.

BACKGROUND OF THE INVENTION

Thermoplastic (e.g., polyethylene, polypropylene, etc.) containers and covers are well known in the art and have been used for many years in the battery industry to house the battery's cell elements. The covers have been sealed to the battery containers in a number of ways with the view toward preventing electrolyte leakage from the batteries, and, in some cases, maintaining superambient pressure in the container and preventing ambient air incursion into the battery. A popular technique for sealing a thermoplastic cover to thermoplastic container is a butt-type heat seal made by simultaneously pressing the top edge of the container walls and a corresponding mating surface on the cover against a heated aluminum platen to melt the plastic thereat and, after removing the heated platen, pressing the melted regions of the cover and container together to form a butt weld therebetween. Hayward et al U.S. Pat. No. 441,448 and Kano et al U.S. Pat. No. 3,778,314 disclose variations of this process. This technique is simple and inexpensive but typically produces seals which reliably can only withstand internal pressures of less than about 3 psig. Another technique for sealing covers to containers is to provide a channel around the periphery of the cover, filling the channel with a suitable adhesive (e.g., epoxy resin), embedding the upper edge of the container walls in the sealant and allowing the sealant to cure or otherwise harden. This is a more complicated and costly technique of the aforesaid heat seal process. Another technique, similar to the aforesaid epoxy technique, places a strip of metal particle filled thermoplastic in the cover channel along with the upper edge of the container wall. Thereafter the seal area is bombarded with microwaves to heat the metal particles, fuse the plastic matrix thereabout and bond the cover and the container. Such a technique is shown in Stutzbach et al U.S. Pat. No. 4,460,663 and "Welding Process Seals Deal in Battery Manufacture", Plastics Design Forum, Sep./Oct. 1988, pages 36 and 37. Like the aforesaid epoxy process, this latter technique is more complicated and more expensive than the simpler heat seal technique.

So-called "gas recombination" batteries, operating on the oxygen cycle, consume the internally generated gases within the battery itself rather than exhausting them to the atmosphere. Batteries of this type are sealed and contain pressure relief valves for venting the gases to the atmosphere only after pressure within the container exceeds a predetermined value. Generally speaking, higher internal pressures result in more effective gas recombination with internal pressures of at least about five (5) psig being desirable. The operating pressure of batteries has heretofore been limited to some extent by the ability of the container-cover seal to withstand these higher internal pressures. It would be desirable therefore to have a heat seal between the container and the cover which is both simple and economical to make, and which is capable of withstanding higher internal pressures than are possible with butt-type heat seals alone.

It is an object of the present invention to provide an improved, easily made heat seal between a thermoplastic container and cover and a process for making same, which seal is capable of withstanding internal container pressures greater than about 5 psig without the need for extraneous sealant or filler material at the joint between the container and cover.

This and other objects and advantages of the present invention will become more readily apparent from the detailed description thereof which follows and which is given hereafter in conjunction with the several drawings wherein:

FIG. 1 is a side sectioned view through a thermoplastic multi-cell battery container and cover to be heat sealed together in accordance with the present invention and prior to the heating step;

FIG. 2 is an enlarged, side sectioned view of a portion of the container and cover of FIG. 1 during the heating step;

FIG. 3 is an enlarged, side sectioned view like that of FIG. 2 after the heating tool has been removed; and FIG. 4 is an enlarged view like that of FIGS. 2 and 3 after the container and cover have been pressed together in accordance with the present invention.

BRIEF DESCRIPTION OF THE INVENTION

The invention contemplates a method of heat sealing a thermoplastic cover to a thermoplastic container and the sealed container resulting therefrom. The invention is particularly applicable to the manufacturer of single and multi cell electric storage batteries of the type that generate significant internal pressures during cycling and must remain hermetically sealed to prevent escape of internal gases and electrolyte as well as to prevent the invasion of ambient air thereinto. Accordingly, the invention will be described in the context of a battery container, but, in its broadest aspects, is not limited or in any way restricted thereto. Similarly, while the invention will be described primarily in the context of a single cell battery it is to be understood that it is equally applicable to multi-cell batteries wherein the container is divided into a plurality of individual cell compartments by intercell partition walls. Such intercell partition walls are sealed to the battery cover in the same manner as the outer peripheral walls of the container are sealed to the cover. In accordance with the present invention, a thermoplastic container (e.g., polypropylene) has a set of walls defining at least one cavity in the container for receiving the battery's electrochemically active innards (i.e., a plurality of alternately spaced positive and negative polarity plates separated one from the other by a porous separator such as microporous polyethylene sheet or a fibrous glass mat). Each of the walls has a sealing lip extending along at least one (e.g., upper) of its edges. The cover has a pair of parallel ribs defining a continuous channel inboard the periphery of the cover. A channel floor lies at the bases/roots of the ribs. The sealing lip on the container mates with the channel on the cover in tongue-and-grove fashion such that the lip is bonded to the cover within the channel in a manner to be described hereafter.

Just prior to mating the container wall lip with the cover channel the floor of the channel and the lip are heated and melted to provide one bead of melt along the channel floor and another bead of melt along the edge of the lip. After the channel floor and lip have been heated sufficiently to form the respective melt beads the heat source (e.g., Al plate) is removed and the beads allowed to cool sufficiently to form a skin of solidified melt over the surface of the bead while leaving the core of the bead still melted. Thereafter, the container and cover are quickly mated, in tongue-and-groove fashion, and pressed together such that the respective skins on the beads are ruptured and allow the melted cores to coalesce before solidification thereof occurs. Continued pressing of the lip into the cover channel further causes the coalesced melt to exude down either side of the lip between the lip and the ribs defining the channel and thereat to solidify and provide an additional bond to that formed by the coalescence of the lip bead melt and the channel bead melt. The assembly is then allowed to cool into a substantially homogeneous weld where the core melts have coalesced as well as a good bonded joint between the lip and the channel via the melt exuded from the coalesced cores to between the lip and the ribs.

In accordance with a preferred embodiment of the present invention, the container and cover will be heated via a heated aluminum plate containing elongated projections or ridges which fit up into the channels and locally heat the channel floor. Heating is preferably accomplished by positioning a heated aluminum plate between the container and the cover while they are aligned for mating and pressing the container and cover against the heated plate for a time sufficient to melt the thermoplastic in contact with the plate and the immediate surrounding region. During heating the projections/ridges are embedded into the channel floor causing a flow of thermoplastic from the floor down along the sides of the heated projections/ridges.

DETAILED DESCRIPTION OF A SPECIFIC EMBODIMENT OF THE INVENTION

FIG. 1 illustrates a battery container 2 having end walls 4, side walls 6 and intercell partition wall 8 defining a plurality of cavities 10 for housing the battery's electrochemically active innards 12 (shown in phantom). Sealing lips 14 on the upper ends of the walls 4, 6 and 8 mate with a channel formed in the cover and are cohesively bonded to the cover therein. More specifically, the cover 16 includes a continuous channel 18 which extends around the periphery of the cover contiguously inboard the peripheral edge 20 of the cover 16. The channel 18 is defined by parallel ribs 22 and 24 depending from the principal plane of the cover and by floor 26 at the base of the channel 18 (i.e., at the roots of the ribs 22-24). The thickness A of the cover 16 at the floor 26 is greater than the thickness B of the cover outside the channel 18 to provide additional thermoplastic material for exuding about the lips 14 of the container walls 4, 6 and 8. Similar channels 18' defined by parallel ribs 22' and 24' and floor 26' are provided transverse the cover 16 as determined by the number of intercell partition walls 8 in the container to be sealed. Several sets of wing-like guides 28 are provided periodically along the length of each channel 18' to guide the intercell partition walls 8 into position in the channels 18' during the final assembly. Similarly, a series of single guides 29 are provided along the length of the continuous channel 18 at the opposite ends of the cover for guiding the end walls 4 of the container into channel 18. The guides 28-29 serve further to guide the heating tool into place as will be discussed hereinafter.

The lips 14 atop the container walls 4, 6 and 8, as well as the floors 26 and 26' of the channels 18 and 18' respectively are preferably substantially concurrently heated by pressing them against a heated plate 32 (i.e., at Ca 700° F. ±50° F.) positioned therebetween. The heated plate has a lower planar surface 34 for engaging the tops of the lips 14, and peripheral and transverse elongated projections/ridges 36 and 38 respectively which extend into the channels 18 and 18' to melt the floors 26 and 26' thereof. As best shown in FIG. 2, the upper edge 40 of the projection/ridges 38 are pushed into the floor 26' of the channel 18' as the thermoplastic thereat melts and exudes down around the upper edge 40 as illustrated at 42. At the same time, the sealing lip 14 atop the walls 4, 6 and 8 and in contact with the plate 32 melts and mushrooms as illustrated at 44 in FIG. 2.

After the floors 26, 26' and the lips 14 have melted, the heated plate 32 is removed (see FIG. 3) and the beads of melt 46 and 48 in the channels 18 and 18' and on the lips 14 are allowed to cool sufficiently to form a first skin 50 of solidified thermoplastic on the cover bead 46 and a second skin 52 of solidified thermoplastic on the lip bead 48 while leaving the cores 54 and 56 of beads 46 and 48 still molten. While the cores 54 and 56 are still molten, and as best shown in FIG. 4 (only one joint shown), the container and cover are pressed together such that the lips 14 mate with the channels 18 and 18' (only 18' shown). The molten beads 46 and 48 are pressed together so as to rupture their respective skins 50 and 52 and cause their molten cores 54 and 56 to coalesce into a unified weld bead 58 and to exude down (as shown at 60) between the lip 14 and ribs 22' and 24' to also bond with the des of the lip 14 and the faces of the ribs 22'-24' on either side of the lip 14.

Six cell (12V) SLI lead-acid storage battery containers made from polypropylene heat sealed in accordance with the present invention have demonstrated a capability of withstanding internal pressures of up to 7 lbs/in$^2$ and are ideally suited for use with gas recombinant batteries or other sealed batteries which require significant super ambient internal pressures for most effective operation.

While the invention has been described in terms of a specific embodiment thereof it is not intended to be limited thereto but rather only to the extent set forth hereafter in the claims which follows.

The embodiments of the invention in which an exclusive property or privilege is claimed are defined as follows:

1. A method of heat-sealing a thermoplastic cover to a thermoplastic container wherein said container has a set of walls defining at least one cavity and a sealing lip extending along at least one edge of each of said walls, and said cover has a pair of parallel ribs defining a substantially continuous channel inboard the periphery of the cover and a channel floor at the bases of said ribs, said lip and channel being adapted to mate in tongue-and-groove fashion one with the other comprising the steps of:

substantially concurrently heating said floor and said lip to provide a first bead of melt in said channel at the bases of said ribs and a second bead of melt along said edge;

cooling each of said beads sufficiently to solidify only the outermost surfaces thereof so as to form a skin of said thermoplastic over a molten core of said melts;

pressing said first and second beads together in said channel so as to rupture said skins and cause said cores to coalesce one with the other and exude between said side wall and said lip; and cooling the coalesced cores to weld said cover to said container.

2. A method of heat-sealing a thermoplastic cover to a thermoplastic container wherein said container has a set of walls defining at least one cavity and a sealing lip extending along at least one edge of each of said walls, and said cover has a pair of parallel ribs defining a substantially continuous channel inboard the periphery of the cover and a channel floor at the bases of said ribs, said lip and channel being adapted to mate in tongue-and-groove fashion one with the other comprising the steps of:

substantially concurrently contacting said edge and said floor with a heated tool so as to provide a first bead of melt in said channel at the bases of said ribs and a second bead of melt along said edge;

removing said tool from contact with said edge and floor;

cooling each of said beads sufficiently to solidify only the outermost surfaces thereof so as to form a skin of said thermoplastic over a molten core of said melt;

pressing said first and second beads together in said channel so as to rupture said skins, and cause said cores to coalesce one with the other and exude between said side wall and said lip; and cooling the coalesced cores to weld said cover to said container.

3. A method of heat-sealing a thermoplastic cover to a thermoplastic container wherein said container has a set of walls defining at least one cavity and a sealing lip extending along at least one edge of each of said walls, and said cover has a pair of parallel ribs defining a substantially continuous channel inboard the periphery of the cover and a channel floor at the bases of said ribs, said lip and channel being adapted to mate in tongue-and-groove fashion one with the other comprising the steps of:

embedding a heated tool in said floor along the length of said channel for a time sufficient to melt said floor and provide a first bead of melt in said channel at the bases of said ribs;

contacting said edge with a heated tool so as to provide a second bead of melt along said edge;

removing said tool from contact with said edge and floor;

cooling each of said beads sufficiently to solidify only the outermost surfaces thereof so as to form a skin of said thermoplastic over a molten core of said melt;

pressing said first and second beads together in said channel so as to rupture said skins, and cause said cores to coalesce one with the other and exude between said side wall and said lip; and cooling the coalesced cores to weld said cover to said container.

4. Method according to claim 3 wherein said floor has a greater thickness of said thermoplastic than the remainder of the cover overlying said cavity.

5. A method of heat-sealing a thermoplastic cover to a thermoplastic container wherein said container has a set of walls defining at least one cavity and a sealing lip extending along at least one edge of each of said walls, and said cover has a pair of parallel ribs defining a substantially continuous channel inboard the periphery of the cover and a channel floor at the bases of said ribs, said lip and channel being adapted to mate in tongue-and-groove fashion one with the other comprising the steps of:

substantially concurrently contacting said edge and said floor with a heated tool so as to provide a first bead of melt in said channel at the bases of said ribs and a second bead of melt along the said edge;

removing said tool from contact with said edge and floor;

cooling each of said beads sufficiently to solidify only the outermost surfaces thereof so as to form a skin of said thermoplastic over a molten core of each of said melts;

pressing said lip into said floor so as to rupture the skins on said beads and to cause said cores to coalesce one with the other and exude between said side wall and said lip; and cooling the coalesced cores to weld said cover to said container.

* * * * *